United States Patent
Blunt (10) Patent No.: US 9,614,319 B2
(45) Date of Patent: Apr. 4, 2017

(54) REEL-IN-BOX JUMPER CABLES

(75) Inventor: Thomas Randy Blunt, Mesa, AZ (US)

(73) Assignee: PPC BROADBAND, INC., East Syracuse, NY (US)

( * ) Notice: Subject to any disclaimer, the term of this patent is extended or adjusted under 35 U.S.C. 154(b) by 1535 days.

(21) Appl. No.: 13/237,815

(22) Filed: Sep. 20, 2011

(65) Prior Publication Data

US 2013/0068869 A1    Mar. 21, 2013

(51) Int. Cl.
E01F 9/018    (2006.01)
F16D 9/00     (2006.01)
F16P 5/00     (2006.01)
H01R 13/60    (2006.01)
H01R 13/72    (2006.01)

(52) U.S. Cl.
CPC ............. H01R 13/60 (2013.01); H01R 13/72 (2013.01); Y10T 403/11 (2015.01)

(58) Field of Classification Search
CPC ....... Y10T 403/11; H01R 13/62; H01R 13/72; H01R 4/20
USPC ... 403/2, 286, 292, 293, 294, 299, 300, 301, 403/305; 439/345, 369; D13/137.2, 154
See application file for complete search history.

(56) References Cited

U.S. PATENT DOCUMENTS

| | | | | |
|---|---|---|---|---|
| 559,168 A | * | 4/1896 | Evans .................... | C04B 37/026 310/249 |
| 1,532,882 A | * | 4/1925 | Carpenter ............... | F16G 11/08 279/99 |
| 2,276,571 A | * | 3/1942 | Grypma .................... | H01R 4/20 156/49 |
| 2,917,569 A | * | 12/1959 | Senior, Jr. ................ | H01R 4/20 174/84 R |
| 3,609,638 A | * | 9/1971 | Darrey ............... | H01R 13/6392 24/332 |
| 3,783,487 A | * | 1/1974 | May ........................ | H01R 4/20 174/84 C |
| 4,720,204 A | * | 1/1988 | Johnson .................. | E04H 12/32 285/2 |
| 4,806,042 A | * | 2/1989 | Swank ...................... | F16B 3/00 403/101 |
| 5,454,729 A | * | 10/1995 | Wen-Te ............. | H01R 13/6273 439/357 |
| 5,466,082 A | * | 11/1995 | Sherar ..................... | B66C 15/00 403/157 |

(Continued)

Primary Examiner — Gregory Binda
Assistant Examiner — Nahid Amiri
(74) Attorney, Agent, or Firm — Oliff PLC (57) ABSTRACT

A connecting device for connecting runs of communication material having a predetermined length and coupling elements at both ends is provided. The connecting device includes a first end, an opposing second end, and a separating element. The first end couples to a coupling element of a first run of communication material and the second end couples to a coupling element of a second run of communication material. The first run and second run of communication material is separated in response to activation of the separating element. Also provided is a bulk cable packaging system that includes a plurality of runs of communication material, each run having a predetermined length and coupling elements at both ends and a plurality of connecting devices. The runs of communication material are coupled together with the connecting devices is operatively coupled to a reel. The reel is then operatively coupled within a container.

29 Claims, 6 Drawing Sheets

(56) References Cited

U.S. PATENT DOCUMENTS

| | | | | |
|---|---|---|---|---|
| 5,474,408 A * | 12/1995 | Dinitz | ................... | E01F 9/0182 |
| | | | | 256/13.1 |
| 5,649,835 A * | 7/1997 | Weed | ................... | H01R 13/623 |
| | | | | 439/320 |
| 6,237,768 B1 * | 5/2001 | Cipriani | ............... | B65D 5/5033 |
| | | | | 206/408 |
| 6,292,436 B1 * | 9/2001 | Rau | ...................... | G01V 1/3826 |
| | | | | 114/245 |
| 6,398,578 B1 * | 6/2002 | Huang | .............. | H01R 13/6272 |
| | | | | 439/359 |
| 6,454,576 B1 * | 9/2002 | Hedrick | ............. | H01R 13/5812 |
| | | | | 439/105 |
| 7,228,047 B1 * | 6/2007 | Szilagyi | ............... | G02B 6/3878 |
| | | | | 385/134 |
| 7,299,558 B2 * | 11/2007 | Wang | ..................... | B44D 3/38 |
| | | | | 33/413 |
| 7,424,996 B2 * | 9/2008 | Larsen | ................... | G01L 5/101 |
| | | | | 116/212 |
| 7,744,286 B2 * | 6/2010 | Lu | ........................ | G02B 6/3816 |
| | | | | 385/53 |
| 7,798,845 B1 * | 9/2010 | Buchanan | .......... | H01R 13/6397 |
| | | | | 439/502 |
| 2002/0019627 A1 * | 2/2002 | Maguire | ............ | A61B 18/1492 |
| | | | | 606/27 |
| 2009/0253521 A1 * | 10/2009 | Arden | ...................... | F16D 1/02 |
| | | | | 464/32 |

* cited by examiner

REEL-IN-BOX JUMPER CABLES

BACKGROUND OF THE INVENTION

Technical Field

This invention relates generally to packaging of flexible segments and more particularly to bulk packaging of flexible segments.

State of the Art

Flexible segments, such as hoses, electrical plugs, electrical cables, extension cables, runs of communication material, such as, but not limited to communication cables are packaged differently for various purposes. For example a flexible segment may be packaged individually for sale in a retail store to a consumer needing only one flexible segment of a particular length. Other flexible segments, particularly those being sold in bulk are packaged together. Currently bulk packaging includes bundling several flexible segments, such as 25 cables, together and binding them with devices like tie-wraps and the like. Multiple bundles of cables are then combined in a box and ready for distribution to bulk purchasers.

When the end user purchases the box of cables, the user takes a bundle and then removes the binding to free the cables for use. The cables in this condition are difficult to organize, often resulting in the cables being tangled and unorganized. When cables are tangled and unorganized, they have a greater opportunity to be damaged and rendered unusable, and therefore wasted. The end user is therefore hampered by the unorganized collection of cables as well as hampered by the inevitable loss of some product due to damage.

Accordingly, there is a need in the field of bulk packaging of runs of communication material, for a device and system that improves organization of the runs of communication material while reducing the opportunity of damage to the runs of communication material.

DISCLOSURE OF THE INVENTION

The present invention relates to a connecting device for coupling one flexible segment to another flexible segment. The present invention further relates to a system and method of forming and using the system to dispense a plurality of flexible segments coupled together by use of a plurality of connecting devices.

An embodiment of the present invention includes a connecting device for connecting runs of communication material having a predetermined length. The connecting device comprises a first end and an opposing second end and a separating element. In some embodiments the first end couples to a coupling element of a first run of communication material and the second end couples to a coupling element of a second run of communication material. Further, in some embodiments the first run and second run of communication material are separated in response to activation of the separating element.

Another embodiment of the present invention includes a bulk cable packaging system. The system comprises a plurality of runs of communication material, each run having a predetermined length and coupling elements at both ends and a plurality of connecting devices. Each connecting device couples one run of communication material to another run of communication material. In some embodiments, each connecting device comprises a first end and an opposing second end and a separating element. Further, in some embodiments, the first end couples to a coupling element of a run of communication material and the second end couples to a coupling element of another run of communication material. Additionally, the runs of communication material are separable in response to activation of the separating element.

Yet another embodiment of the present invention includes a method of forming and using bulk cable packaging system. The method comprises providing a bulk packaging system comprising a plurality of runs of communication material, each run having a predetermined length and coupling elements at both ends; a plurality of connecting devices, each connecting device coupling one run of communication material to another run of communication material; a reel, wherein a predetermined amount of runs of communication material of the plurality of runs of communication material coupled together by the plurality of connecting devices is operatively coupled to the reel; and a container having a dispensing opening, wherein the reel with the predetermined runs of communication material is operatively coupled within the container. In some embodiments, the method also comprises dispensing a run of communication material through the dispensing opening until a connecting device is accessible; and separating the run of communication material from another run of communication material in response to separating a separating element of the connecting device.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to a connecting device for coupling one run of communication material with a coupling element on each end to another run of communication material with a coupling element on each end. The present invention further relates to a bulk packaging system to dispense a plurality of runs of communication material coupled together by use of a plurality of connecting devices.

Figure 1:
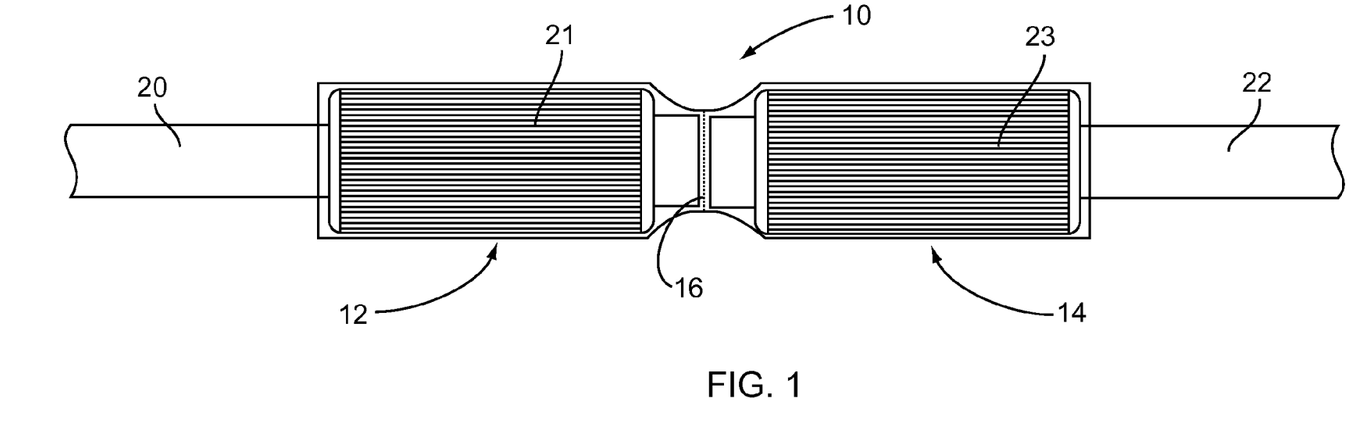
FIG. 1 is a perspective view of a connecting device coupled between two runs of communication material.

Referring to the drawings, FIG. 1 depicts a connecting device 10 for connecting flexible segments including runs of communication material having a predetermined length. The connecting device 10 comprises a first end 12 and an opposing second end 14. The connecting device 10 further includes a separating element 16. The first end 12 couples to a coupling element 21 of a first run of communication material 20 and the second end 14 couples to a coupling element 23 of a second run of communication material 22. The first run and second run of communication material 20 and 22 are separated in response to activation of the separating element 16. For example, and not as a limitation, the activation of the separating element 16 may be accomplished by applying force on the coupling element 21 and on the coupling element 23 in opposite directions, wherein the force is translated to the connecting device 10 and thereby manually activating the separating element 16.

According to some embodiments, the connecting device 10 is formed of shrink wrap. In these embodiments, the separating element 16 is perforations in the shrink wrap. For example, as shown in FIG. 1, the separating element 16 that is perforations may extend completely or partially around the connecting device 10, wherein the perforations are in a direction that is transverse to an axis of the first and second run of communication material.

Figure 2:
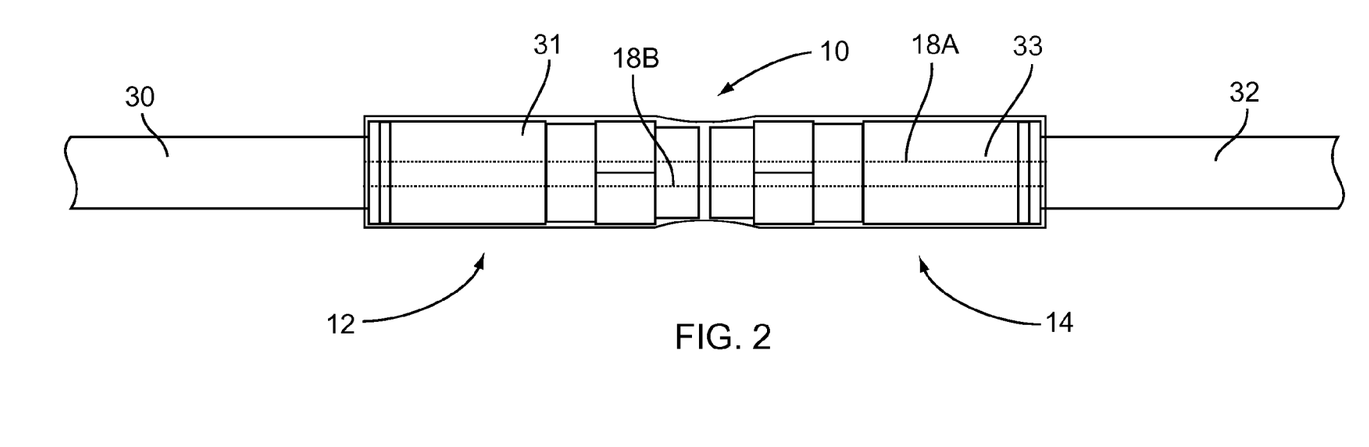
FIG. 2 is another perspective view of a connecting device coupled between two runs of communication material.

Referring to the drawings, FIG. 2 depicts a connecting device 10 for connecting runs of communication material having a predetermined length and coupling elements at both ends. The connecting device 10 comprises a first end 12 and an opposing second end 14. The connecting device 10 further includes a separating element 18A and in some embodiments, a second separating element 18B. The first end 12 couples to a coupling element 31 of a first run of communication material 30 and the second end 14 couples to a coupling element 33 of a second run of communication material 32. The first run and second run of communication material 30 and 32 are separated in response to activation of the separating element 18A or separating elements 18A and 18B. For example, and not as a limitation, the activation of the separating element 18A or separating elements 18A and 18B may be accomplished by applying force on one or both of the coupling element 31 and the coupling element 33 in opposite directions, wherein the force is translated to the connecting device 10 and thereby manually activating the separating element 18A or separating elements 18A and 18B to disengage the connecting device 10.

According to some embodiments, the connecting device 10 is formed of shrink wrap. In these embodiments, the separating element 18A and separating element 18B are perforations in the shrink wrap. For example, as shown in FIG. 2, the separating element 18A and 18 B that are perforations may extend from the first end 12 to the second end 14. These perforations may be directed in a straight line or a curved line, or a helical line.

With regard to FIGS. 1 and 2, embodiments wherein the connecting device 10 is shrink wrap, the shrink wrap may extend to entirely cover each coupling element of the runs of communication material. In some embodiments, the shrink wrap covers only a portion of each coupling element of the runs of communication material.

Figure 3:
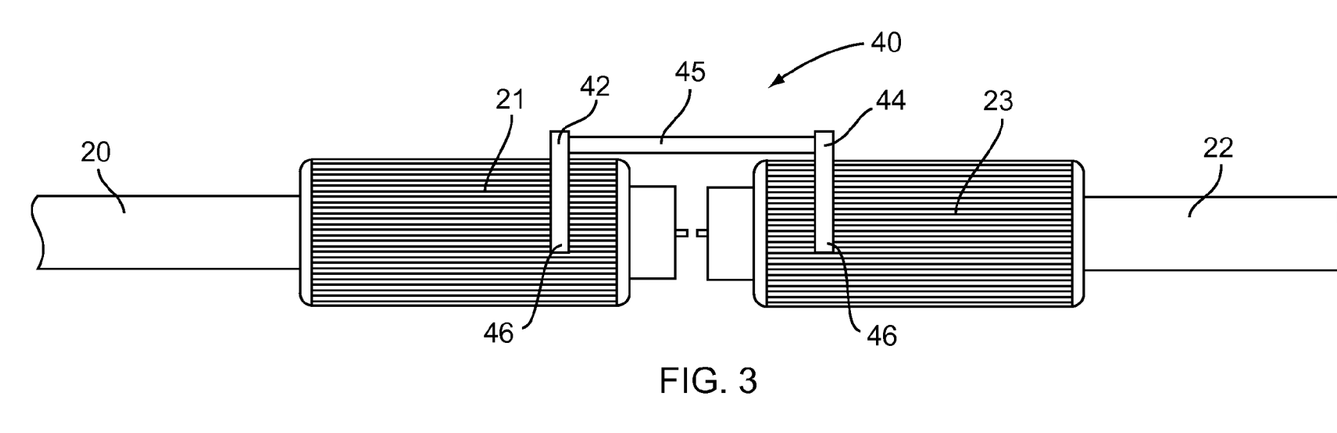
FIG. 3 is a perspective view of a second connecting device coupled between two runs of communication material.

In FIG. 3, another embodiment depicts a connecting device 40 having a first end 42 and a second end 44. The first end 42 couples to a coupling element 21 of a first run of communication material 20 and the second end 44 couples to a coupling element 23 of a second run of communication material 22. In this particular embodiment, the connecting device 40 may be formed of a plastic material. The connecting device 42 further comprises a body portion 45 coupled between the first end 42 and the second end 44. The body portion 45 functions to separate the first end 42 and the second end 44 a predetermined distance, wherein when the connecting device 40 is coupled between two runs of communication material 20 and 22, the communication material is not damaged, such as, but not limited to connectors, conductors and the like.

The connection device 40 further comprises a separating element 46. The separating element 46 comprises resilient members formed as part of the first end 42 and the second end 44. The separating element 46 engages the coupling elements 21 and 23. The first run and second run of communication material 20 and 22 are separated in response to activation of the separating element 46. For example, and not as a limitation, the activation of the separating element 46 may be accomplished by applying force on the coupling element 21 and on the coupling element 23 in opposite directions, wherein one of the directions is in a direction away from and transverse to the length of the body portion 45 of the connecting device 40.

Figure 4:
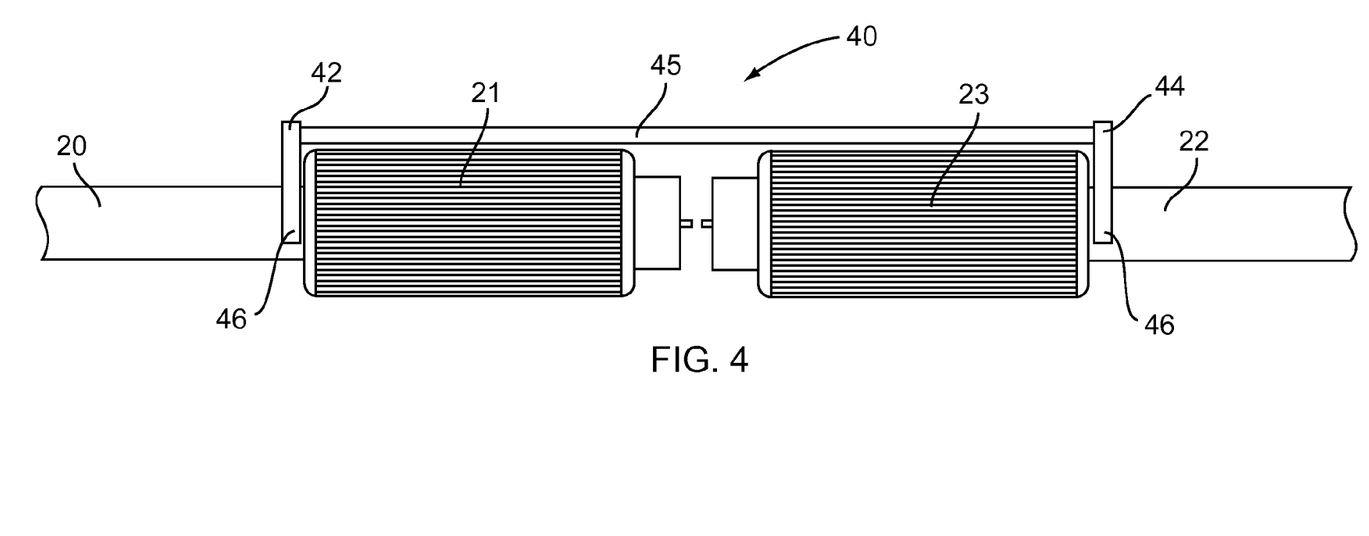
FIG. 4 is a perspective view of a third connecting device coupled between two runs of communication material.

In FIG. 4, another embodiment depicts a connecting device 40 having a first end 42 and a second end 44. The first end 42 couples to a first run of communication material 20 adjacent a coupling element 21 and the second end 44 couples to a second run of communication material 22 adjacent to a coupling element 23. In this particular embodiment, the connecting device 40 may be formed of a plastic material. The connecting device 42 further comprises a body portion 45 coupled between the first end 42 and the second end 44. The body portion 45 functions to separate the first end 42 and the second end 44 a predetermined distance, wherein when the connecting device 40 is coupled between two runs of communication material 20 and 22, the communication material is not damaged, such as, but not limited to connectors, conductors and the like.

The connection device 40 further comprises a separating element 46. The separating element 46 comprises resilient members formed as part of the first end 42 and the second end 44. The separating element 46 engages the first and second run of communication material 20 and 22. The first run and second run of communication material 20 and 22 are separated in response to activation of the separating element 46. For example, and not as a limitation, the activation of the separating element 46 may be accomplished by applying force on the first run of communication material 20 and on the second run of communication material in opposite directions, wherein one of the directions is in a direction away from and transverse to the length of the body portion 45 of the connecting device 40.

While is shown in FIGS. 3 and 4 that the first and second ends 42 and 44 are U-shaped devices with resilient portions forming the separating elements 46, other embodiments are also contemplated in this disclosure. For example, and without limitation, the first and second ends 42 and 44 may each be a barrel-shape that are friction fit over the coupling elements of the runs of communication material. The separating element 16 of this is the friction fit, wherein force applied to the run of material and to the connecting device 40 in opposite directions results in separating the run of material from the connecting device 40.

With regard to FIGS. 1-4, wherein the first ends 12 and 42 and the second ends 14 and 44 of the respective connecting devices 10 and 40 are removable from the runs of communication material prior to use.

Figure 5:
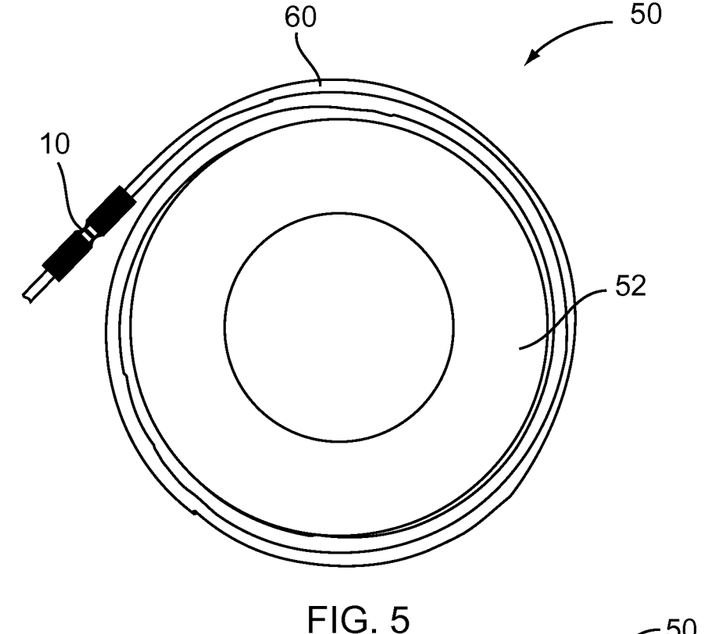
FIG. 5 is a bulk packaging system of a plurality of runs of communication material.
Figure 6:
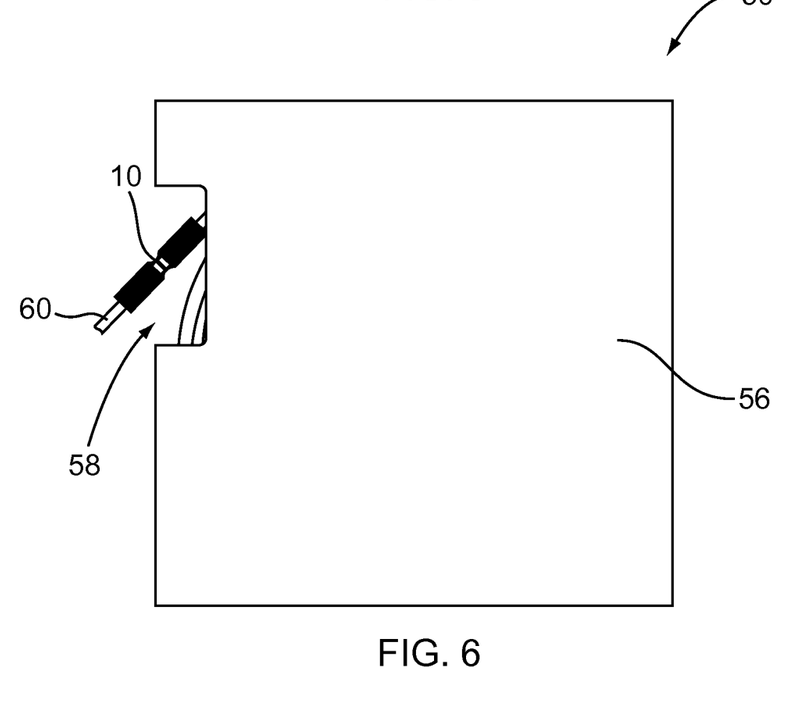
FIG. 6 is a bulk packaging system including a container.

Referring again to the drawings, FIGS. 5-6 depict a bulk cable packaging system 50. The system 50 comprises a plurality of runs of communication material 60, each run having a predetermined length and coupling elements 62 at both ends. The system 50 further comprises a plurality of connecting devices 10, each connecting device coupling one run of communication material 60 to another run of communication material 60. Each connecting device 10 includes a first end 12, an opposing second end 14 and a separating element 16. The first end 12 couples to a coupling element 62 of a run of communication material 60 and the second end 14 couples to a coupling element 62 of another run of communication material 60. Additionally, the runs of communication material 60 are separable in response to activation of the separating element 16 of the connecting device 10 coupled between the runs of communication material 60. In some embodiments, each of the plurality of connecting devices 10 is formed of shrink wrap. Further, in this embodiment the separating element 16 of each of the plurality of connecting devices 10 is perforations in the shrink wrap.

The system 50 further comprising a reel 52, wherein a predetermined amount of runs of communication material 60 of the plurality of runs of communication material 60 coupled together by the plurality of connecting devices 10 is operatively coupled to the reel 10. The reel 52 with the predetermined runs of communication material 60 is operatively coupled within a container 56 having a dispensing opening 58 for dispensing the runs of communication material 60. In some embodiments, the runs of communication material 60 is operatively coupled to the reel 52 in that the predetermined amount of runs of communication material 60 is wound around the reel 52. The reel 52 is operatively coupled within the container 56 in that the reel 52 is rotatable within the container 56 for enabling dispensing of the runs of communication material 60.

In some embodiments, the predetermined amount runs of communication material 60 are accessible through the dispensing opening 58, wherein each separating element 16 is resistant to separation when extracting one or more than one run of communication material 60 through the dispensing opening 58.

According to some embodiments, the system 50 may include a plurality of reels 52 having a predetermined amount of runs of communication material 60 of the plurality of runs of communication material 60 that is operatively coupled within the container 56 and dispensable from the container 56.

In particular embodiments, the length of the runs of communication material 60 may vary. For example, and not by limitation, the lengths may alternate between two predetermined lengths, three lengths or a plurality of lengths.

The system 50 comprises a predetermined amount of runs of communication material 60, which are coupled end to end by a plurality of connecting devices 10. In some embodiments, the connecting devices 10 comprise an indicator 70, wherein the indicator 70 signals that the amount of runs of communication material 60 wound around the reel 52 has dropped below a predetermined value during use of the system 50. This indicator 70 may be any type of indicator, such as a number, wherein the number is reduced each time a run of communication material 60 is removed from the container 56. The indicator 70 may be a color, such as a spot of color, a line of color or a full color of the connecting device. It is contemplated that various colors or indicators 70 may be utilized at various threshold levels of amounts of run of communication material left within the container 56.

Figure 7:
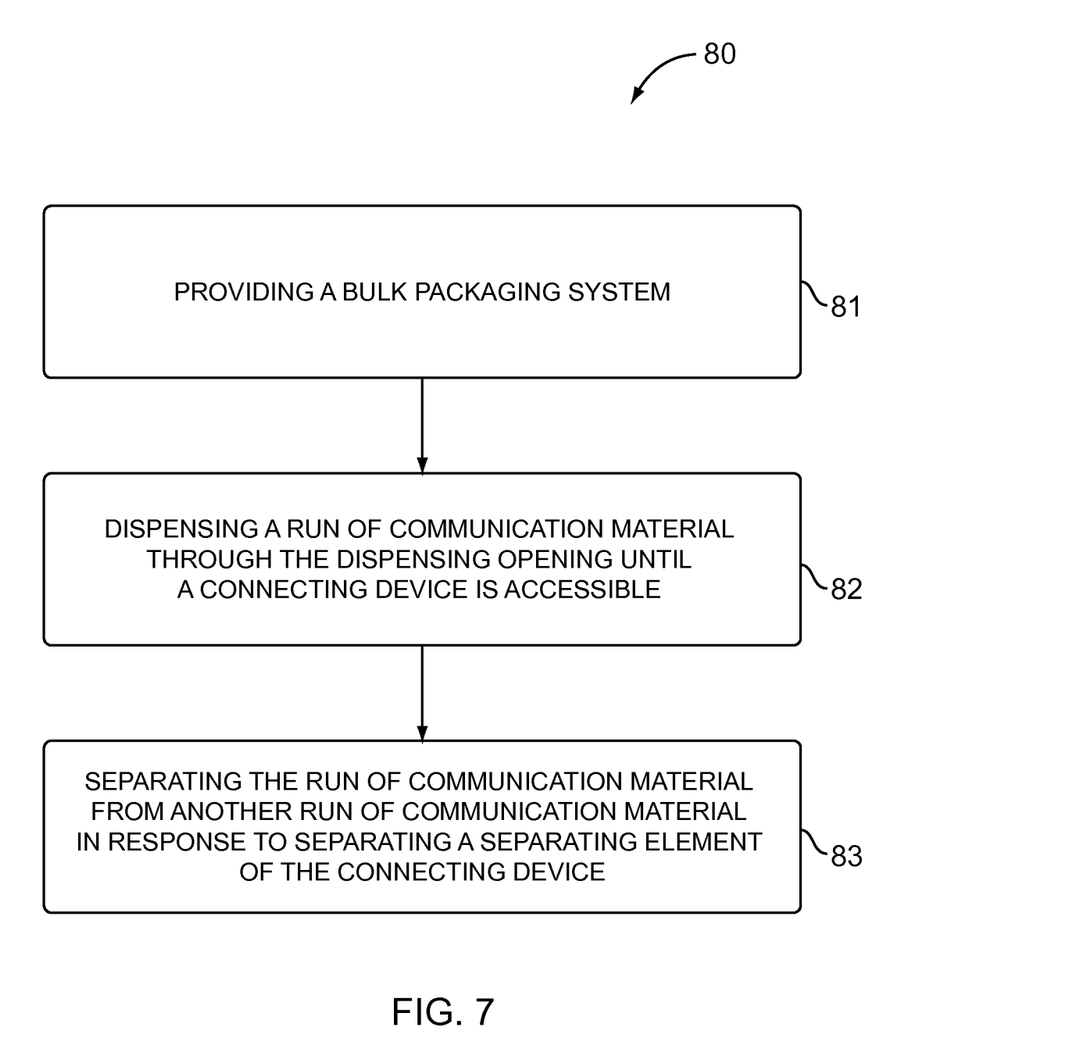
FIG. 7 is a method of forming and using a bulk packaging system of a plurality of runs of communication material.

As shown in FIG. 7, particular embodiments include a method 80 of forming and using bulk cable packaging system. The method 80 comprises providing a bulk packaging system (Step 81), dispensing a run of communication material through the dispensing opening until a connecting device is accessible (Step 82), and separating the run of communication material from another run of communication material in response to separating a separating element of the connecting device (Step 83).

Providing a bulk packaging system further comprises providing bulk packaging system that comprises a plurality of runs of communication material, each run having a predetermined length and coupling elements at both ends; a plurality of connecting devices, each connecting device coupling one run of communication material to another run of communication material; a reel, wherein a predetermined amount of runs of communication material of the plurality of runs of communication material coupled together by the plurality of connecting devices is operatively coupled to the reel; and a container having a dispensing opening, wherein the reel with the predetermined runs of communication material is operatively coupled within the container.

In some embodiments, the method 80 further comprises leaving a portion of a run of communication material extending from the container after separating the run of communication material from another run of communication material.

Step 82 of dispensing a run of communication material, in some embodiments, comprises manually pulling on a run of communication material, wherein the reel with the predetermined runs of communication material rotates and partially unwinds the predetermined run of communication material.

The method 80 further comprises providing an indicator on a predetermined number of connecting devices, wherein the indicators signal that the amount of runs of communication material wound around the reel has dropped below a predetermined value during use of the system.

Figure 8:
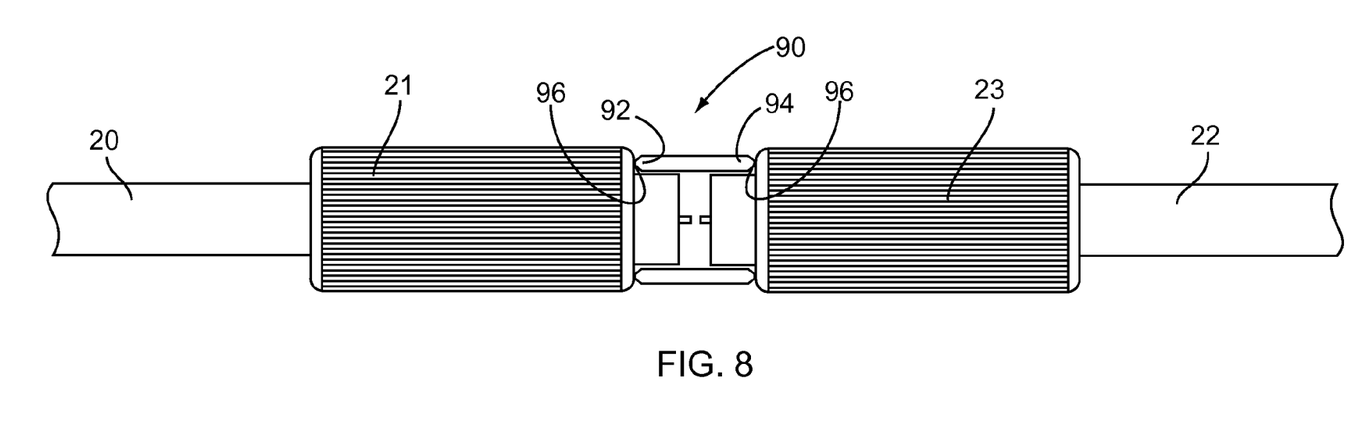
FIG. 8 is an optional embodiment of connecting a two runs of communication material.
Figure 9:
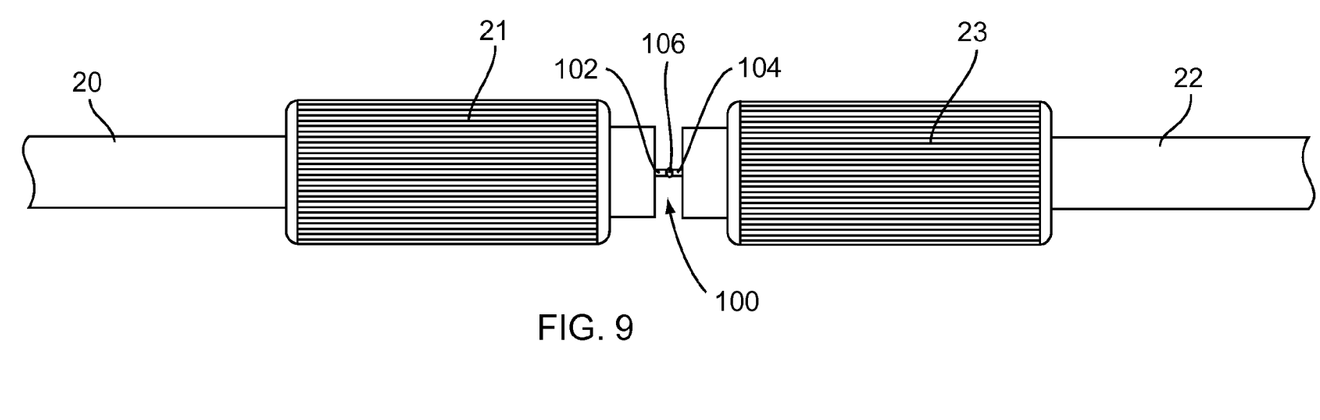
FIG. 9 is another optional embodiment of connecting two runs of communication material.

Additional embodiments of a connecting device are provided in FIGS. 8 and 9. In FIG. 8, a connecting device 90 comprises a first end 92 and an opposing second end 94, wherein the first end 92 is coupled to a coupling element 21 of a first run of communication material 20 and the second end 94 is coupled to a coupling element 23 of a second run of communication material 22. The connecting device 90 comprises a separating element 96. The separating element 96 includes reduced sections of the connecting device 90 that is coupled to outer sleeves of the coupling elements 21 and 23. The reduced sections forming the separating element 96 provide a user the ability to apply force and break the coupling at separating element 96 because the reduced section reduces the strength of the connecting device 90.

The connecting device 90 may be formed of a plastic material and may be coupled to plastic sleeves around the coupling elements 21 and 23. The connecting device 90 formed of plastic may be coupled the plastic sleeves by melting the ends of the connecting device and coupling it to the sleeves. In other embodiments, the sleeves may be formed with the connecting device 90 formed as part of the sleeves, wherein the sleeves are then coupled to the coupling elements 21 and 23.

In FIG. 9, a connecting device 100 is depicted according to a particular embodiment to connect a first run of communication material 20 to a second run of communication material 22. The connecting device 100 comprises a first end 102 and an opposing second end 104, wherein the first end 102 is coupled to a coupling element 21 of a first run of communication material 20 and the second end 104 is coupled to a coupling element 23 of a second run of communication material 22. In some embodiments, the first end 102 is a first inner conductor of the coupling element 21 and the second end 104 is a second inner conductor of the coupling element 23. The first inner conductor 102 and the second inner conductor 104 are fused together. The connecting device 100 further comprises a separating element 106, wherein the separating element 106 is the fusing point between the first and second inner conductors 102 and 104. In this embodiment, the fusing point is weakened material that can be severed by applying force in opposite directions.

In FIGS. 1-9 and in the description regarding the same, the flexible segment is a run of communication material. A run of communication material includes, without limitation, a cable, a coaxial cable, an HDMI cable, a USB cable, a 3-prong cable, a 2-prong cable, an extension cord, telecommunications cables and the like. Flexible segments may also include other non-communication material, such as, but not limited to a hose, a garden hose, a hydraulic hose, catheter tubing, and the like.

Figure 10:
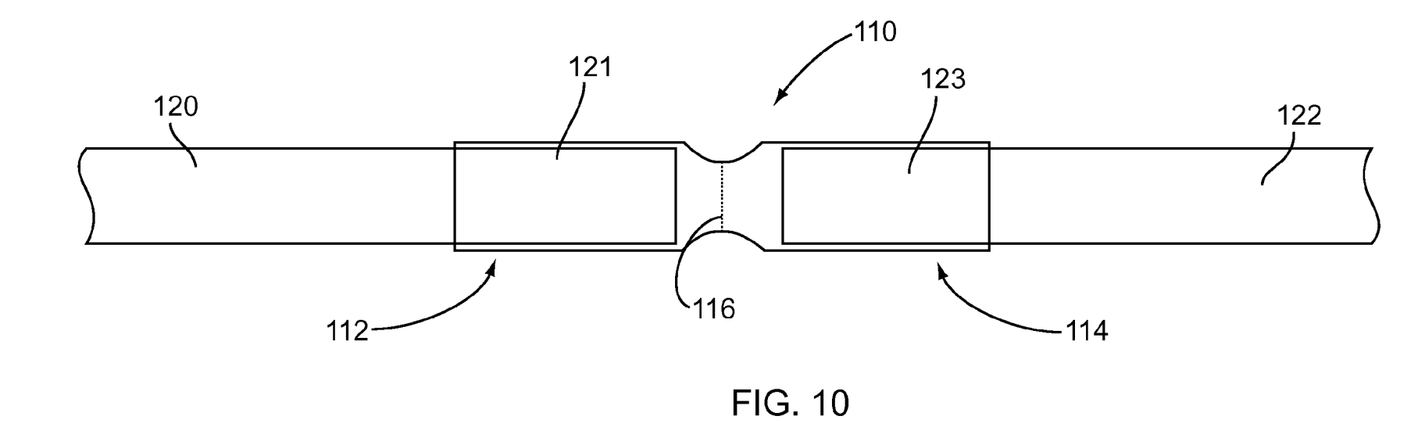
FIG. 10 is a perspective view of an exemplary connecting device for coupling two flexible segments.

Referring to the drawings, FIG. 10 depicts a connecting device 110 for connecting flexible segments having a predetermined length. The connecting device 110 comprises a first end 112 and an opposing second end 114. The connecting device 110 may further include a separating element 116. The first end 112 couples to an end 121 of a first flexible segment 120 and the second end 114 couples to an end 123 of a second flexible segment 122. The first and second flexible segments 120 and 122 are separated in response to disengaging the connecting device 110. In particular embodiments, the connecting device 110 may be disengaged in response to activation of the separating element 116. For example, and not as a limitation, the activation of the separating element 116 may be accomplished by applying force on one or both of the end 121 of the first flexible segment 120 and the end 23 of the second flexible segment 122 in opposite directions, wherein the force is translated to the connecting device 110 and thereby manually activating the separating element 116 to disengage the connecting device 110.

According to some embodiments, the connecting device 110 is formed of shrink wrap. In these embodiments, the separating element 116 is perforations in the shrink wrap. For example, as shown in FIG. 10, the separating element 116 that is perforations may extend completely or partially around the connecting device 110, wherein the perforations are in a direction that is transverse to an axis of the first and second run of communication material.

Figure 11:
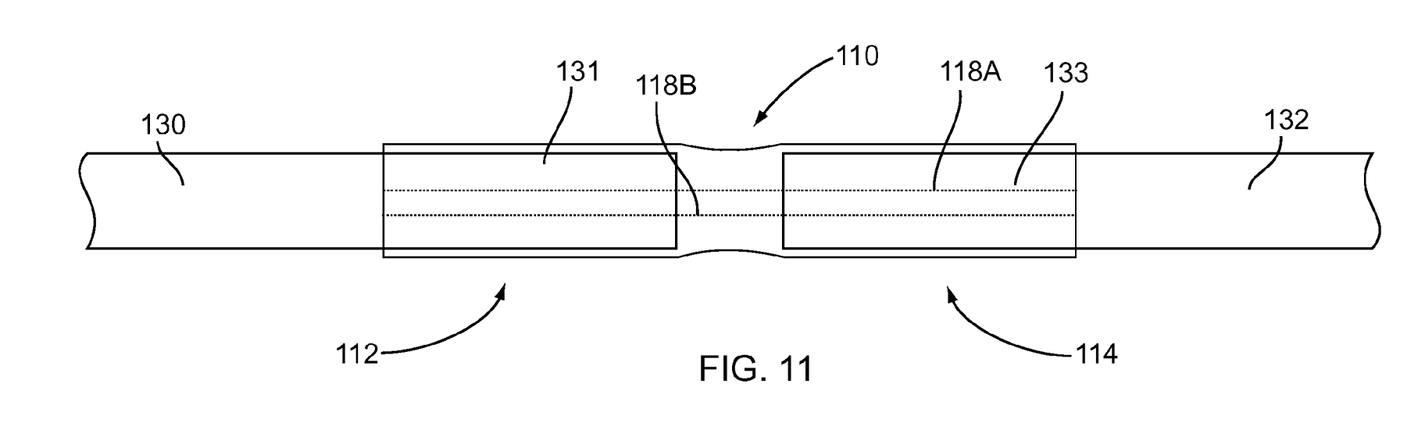
FIG. 11 is a perspective view of another exemplary connecting device for coupling two flexible segments.

Referring to the drawings, FIG. 11 depicts a connecting device 110 for connecting flexible segments having predetermined lengths. The connecting device 110 comprises a first end 112 and an opposing second end 114. The connecting device 110 further includes a separating element 118A and in some embodiments, a second separating element 118B. The first end 112 couples to an end 131 of a first flexible segment 130 and the second end 114 couples to an end 133 of a second flexible segment 132. The first and second flexible segments 130 and 132 are separated in response to activation of the separating element 118A or separating elements 118A and 118B. For example, and not as a limitation, the activation of the separating element 118A or separating elements 118A and 118B may be accomplished by applying force on one or both of the coupling element 131 and the coupling element 133 in opposite directions, wherein the force is translated to the connecting device 110 and thereby manually activating the separating element 118A or separating elements 118A and 118B to disengage the coupling element 133.

According to some embodiments, the connecting device 110 is formed of shrink wrap. In these embodiments, the separating element 118A and separating element 118B are perforations in the shrink wrap. For example, as shown in FIG. 11, the separating element 118A and 118 B that are perforations may extend from the first end 112 to the second end 114. These perforations may be directed in a straight line or a curved line, or a helical line.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A package of connected runs of communication material having a predetermined length, the package comprising:
a first run of communication material;
a second run of communication material; and
a connecting device configured to couple the first run of communication material with the second run of communication material in a non-electrically connected configuration, the connecting device having a first end and an opposing second end, the first end of the connecting device being coupled to an end of the first run of communication material, the second end of the connecting device being coupled to an end of the second run of communication material,
wherein the first run of communication material and the second run of communication material are separable from one another in response to disengaging the connecting device, and
wherein the connecting device comprises shrink wrap.

2. The device of claim 1, wherein the connecting device further comprises a separating element configured to disengage the connecting device.

3. The device of claim 2, wherein the separating element comprises perforations in the shrink wrap.

4. The device of claim 1, wherein the first end of the connecting device is removable from the first run of communication material and the second end of the connecting device is removable from the second run of communication material prior to use of the first run of communication material and the second run of communication material.

5. The device of claim 1, wherein the end of the first run of communication material is terminated with a first coupling element and the end of the second run of communication material is terminated with a second coupling element.

6. The device of claim 5, wherein the first end of the connecting device is coupled to the first coupling element and the second end of the connecting device is coupled to the second coupling element.

7. The device of claim 6, wherein the first run of communication material and the second run of communication material each comprise a run of coaxial cable, and
wherein the first coupling element and the second coupling element each comprise a coaxial cable connector.

8. A packaging system, comprising:
a plurality of runs of communication material, each run of the plurality of runs having a predetermined length and coupling elements at both ends, each run of the plurality of runs of communication material having a first end and a second end, the first end of each run of the plurality of runs is terminated with a first coupling element, and the second end of each run of the plurality of runs is terminated with a second coupling element; and a plurality of connecting devices, each connecting device being configured to couple a first run of the plurality of runs of communication material with a second run of the plurality of runs of communication material in a non-electrically connected configuration, each connecting device having a first end and an opposing second end, the first end of the connecting device being coupled to the first coupling element of the first run, and the second end of the connecting device being coupled to the second coupling element of the second run, wherein the first run and the second run are separable from one another in response to disengaging the connecting device, and wherein the connecting device comprises shrink wrap.

9. The system of claim 8, wherein each of the plurality of connecting devices comprises a separating element configured to disengage the connecting device.

10. The system of claim 9, wherein the separating element of each of the plurality of connecting devices comprises perforations in the shrink wrap.

11. The system of claim 8, further comprising a reel, wherein a predetermined number of runs of communication material of the plurality of runs of communication material are coupled together by the plurality of connecting devices and are wound about the reel.

12. The system of claim 11, further comprising a container configured to house the reel with the predetermined number of runs of communication material, the container having a dispensing opening for dispensing the predetermined number of runs of communication material.

13. The system of claim 12, wherein predetermined number of runs of communication material are accessible through the dispensing opening, and
wherein each separating element is resistant to separation when extracting one or more than one of the predetermined number of runs of communication material through the dispensing opening.

14. The system of claim 13, wherein the reel is rotatable within the container for enabling dispensing of the predetermined number of runs of communication material.

15. The system of claim 12, wherein at least one of the plurality of connecting devices comprises an indicator, wherein the indicator signals that the amount of runs of communication material wound around the reel has dropped below a predetermined value during use of the system.

16. The system of claim 8, further comprising a container containing a plurality of reels, each of the plurality of reels having a predetermined number of runs of communication material of the plurality of runs of communication material wound thereon and dispensable from the container.

17. The system of claim 8, wherein each run of the plurality of runs of communication material comprises a run of coaxial cable, and
wherein the first coupling element and the second coupling element each comprise a coaxial cable connector.

18. A connecting device for connecting flexible segments having a predetermined length, the connecting device comprising:

a first flexible segment;
a second flexible segment; and
a connecting device configured to couple the first flexible segment with the second flexible segment, the connecting device having a first end and an opposing second end, the first end of the connecting device being coupled to an end of the first flexible segment, the second end of the connecting device being coupled to an end of the second flexible segment,
wherein the first flexible segment and the second flexible segment are separable from one another in response to disengaging the connecting device, and
wherein the connecting device comprises shrink wrap.

19. The device of claim 18, wherein the connecting device further comprises a separating element configured to disengage the connecting device.

20. The device of claim 19, wherein the separating element comprises perforations in the shrink wrap.

21. The device of claim 20, wherein the connecting device is disengaged in response to separating portions of the connecting device at the perforations.

22. A packaging system, comprising:
a container configured to house a reel;
a plurality of flexible segments, each flexible segment having a predetermined length, each flexible segment of the plurality of flexible segments having a first end and a second end; and
a plurality of connecting devices, each connecting device being configured to couple a first flexible segment of the plurality of flexible segments with a second flexible segment of the plurality of flexible segments, each connecting device having a first end and an opposing second end, the first end of the connecting device being coupled to the first end of the first flexible segment, and the second end of the connecting device being coupled to the second end of the second flexible segment,
wherein a predetermined number of flexible segments of the plurality of flexible segments are coupled together by the plurality of connecting devices and are wound about the reel,
wherein the first flexible segment and the second flexible segment are separable from one another in response to disengaging the connecting device, and
wherein the connecting device comprises shrink wrap.

23. The system of claim 22, wherein each of the plurality of connecting devices comprises a separating element configured to disengage the connecting device.

24. The system of claim 23, wherein each of the separating elements comprises perforations in the shrink wrap.

25. The system of claim 24, wherein the container includes a dispensing opening for dispensing the predetermined number of flexible segments.

26. The system of claim 25, wherein the predetermined number of flexible segments are accessible through the dispensing opening, and
wherein each of the separating elements is resistant to separation when extracting one or more than one of the predetermined number of flexible segments through the dispensing opening.

27. The system of claim 22, wherein the reel is rotatable within the container for enabling dispensing of the predetermined number of flexible segments.

28. The system of claim 22, wherein at least one of the plurality of connecting devices comprises an indicator, wherein the indicator signals that the amount of flexible segments wound around the reel has dropped below a predetermined value during use of the system.

29. The system of claim 22, further comprising at least one additional reel, each additional reel having a predetermined number of flexible segments of the plurality of flexible segments wound thereon and dispensable from the container.

\* \* \* \* \*